C. W. JONES.
METHOD OF MAKING HYDROBROMIC ACID AND APPARATUS THEREFOR.
APPLICATION FILED AUG. 31, 1918.
1,398,596.                                          Patented Nov. 29, 1921.
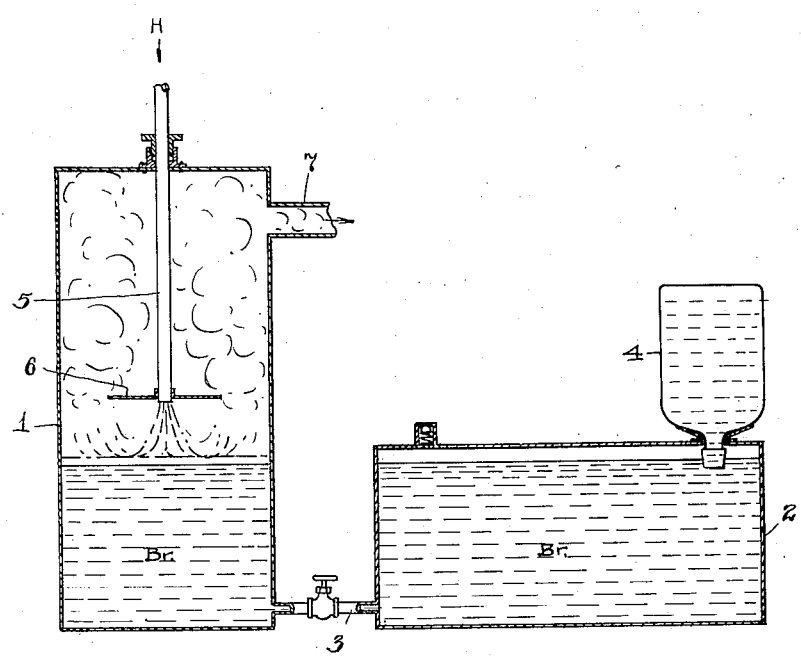
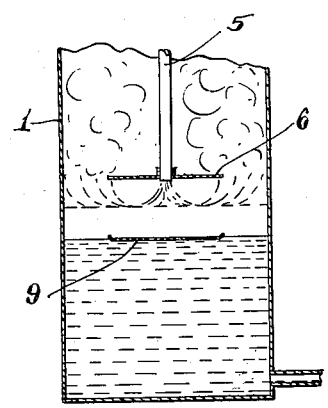
INVENTOR
Coulter W. Jones
By Fay, Oberlin & Fay
ATTORNEYS.

UNITED STATES PATENT OFFICE.

COULTER W. JONES, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING HYDROBROMIC ACID AND APPARATUS THEREFOR.

1,398,596.    Specification of Letters Patent.    Patented Nov. 29, 1921.

Application filed August 31, 1918. Serial No. 252,191.

*To all whom it may concern:*

Be it known that I, COULTER W. JONES, a citizen of the United States, and a resident of Midland, county of Midland, and State of Michigan, have invented a new and useful Improvement in Methods of Making Hydrobromic Acid and Apparatus Therefor, of which the following is a specification, the principle of the invention being herein explained and the best mode in which I have contemplated applying that principle, so as to distinguish it from other inventions.

It is of course known that hydrochloric acid may be formed by the direct union of hydrogen with chlorin, in the absence of air or oxygen, the former being burned in the latter or vice versa. The union will also take place by exposing a mixture of the two gases in bright sunlight. The direct union, however, of hydrogen and bromin to form hydrobromic acid is not so easily accomplished, and so far as I am aware has never been made use of in any practical or commercial way. The purpose of the present invention is to provide a process whereby these two elements may be brought directly into combination in a simple apparatus and in such a manner that the reaction is practically automatic, requiring little or no attention on the part of the operator.

To the accomplishment of the foregoing and related ends the invention then consists of the means and steps hereinafter fully described and particularly pointed out in the claims, the annexed drawing illustrating but one of the various ways in which the object of the invention may be accomplished.

In said annexed drawing:—

Figure 1 is a sectional view more or less diagrammatic in character of the apparatus adapted for carrying on my improved process; Fig. 2 is a similar view of a portion of such apparatus illustrating a different operative stage.

In its broad aspect the present method, like the one above referred to for making chlorin, is a process of combustion, the hydrogen being burned in an atmosphere of bromin gas, or vice versa, as one may choose to regard the matter. The reaction, which of course requires to be conducted out of contact with the atmosphere, is represented by the simple equation:—$H + Br = HBr$.

The preferred apparatus for carrying out my process as illustrated in the drawing comprises a chamber 1, closed to the atmosphere, and of a suitable material, *e. g.* earthenware or lead, adapted to resist the action both of bromin and hydrobromic acid as well as to withstand the temperature (not extremely high) resulting from the reaction. This chamber is preferably of cylindrical form, with its axis disposed vertically and is connected near its bottom with a supplemental bromin-storage chamber 2, having a capacity sufficient to store a quantity of bromin, which is transferred as used in chamber 1 through the medium of a pipe connection 3. Bromin in liquid form is generally handled in bottles and so chamber 2 is provided with an opening in its upper wall adapted to fit the neck of such a bottle 4, and allow its mouth to project a short distance below. Accordingly, as the level of the liquid in chamber 2 drops, air will be admitted into the bottle and such level restored, as will be readily understood.

The hydrogen is supplied to reaction chamber 1 through a pipe 5 extending centrally into the same through the top and vertically adjustable so as to dispose its lower end at the desired level. Adjacent such lower end, pipe 5 is provided with an annular flange 6, the purpose of which will be further explained. Leading from the upper portion of reaction chamber 1 is a discharge duct 7, through which the product of the reaction *i. e.* hydrobromic acid is withdrawn.

Assuming a body of bromin to be present in the lower portion of chamber 1, the lower end of the hydrogen-supply pipe 5 is brought into proximity with the upper surface of such bromin, the hydrogen supplied through such pipe being ignited in any suitable way, either in an atmosphere of bromin gas or the ordinary atmosphere which may initially fill the chamber above the bromin.

The result is that a jet of such ignited hydrogen is directed downwardly upon the upper surface of the bromin, the effect of which is to continually vaporize the latter and so supply more bromin in gas form for union with the hydrogen. The jet itself will initially assume the more or less conical form illustrated in Fig. 1, but as more bromin is vaporized a blanket of the gas is formed over the liquid, causing the jet or flame to spread or flatten out as shown in Fig. 2. The flange on the lower end of the pipe assists in thus spreading out the jet and in insuring thorough combustion clear to the side walls of the chamber.

As the bromin in the bottom of chamber 1 is consumed, more is supplied from the adjacent storage chamber 2 so as to keep the level substantially constant. The rate at which the bromin is vaporized moreover is automatically regulated by the interposed layer of bromin gas which serves as a blanket to lower the rate of vaporization as it increases in depth and to increase such rate as it decreases in depth. The operation will thus be seen to be practically automatic with the result that save for substituting a fresh bottle of bromin when the one supplying the storage chamber becomes empty, little or no attention is required on the part of the operator.

The hydrobromic acid, which is a white fog in appearance, rises in reaction chamber 1 and is withdrawn through duct 7 to a suitable washing apparatus where it is absorbed in water. A solution of approximately 40% hydrobromic acid may be readily produced, and this can be further concentrated if desired. Some traces of unconsumed bromin vapor may be carried over with the hydrobromic acid, but for the uses to which such acid is ordinarily put, the presence of the bromin is not objectionable. It may, however, be removed in any suitable way if an absolutely pure product is desired.

In order further to assist in spreading the jet from the hydrogen supply pipe 5, a plate 9 may be supported upon the surface of the body of liquid bromin centrally below such pipe, as illustrated in Fig. 2. The plate may be simply allowed to float, being secured in its central position by any suitable means (none shown). It is obviously a matter of indifference, so far as the process is concerned, whether the jet strikes directly onto the liquid, or upon such an interposed spreader plate. I have also found shredded asbestos spread all over the surface of the liquid bromin a very satisfactory substitute for such plate.

Other modes of applying the principle of my invention may be employed instead of the one explained change being made as regards the steps and means herein disclosed, provided the steps or means stated by any one of the following claims or the equivalent of such stated steps or means be employed.

I therefore particularly point out and distinctly claim as my invention.—

1. In a method of making hydrobromic acid the steps which consist in burning hydrogen and bromin vapor, and utilizing the heat of the combustion to vaporize more bromin.

2. In a method of making hydrobromic acid the steps which consist in burning hydrogen and bromin vapor, and utilizing the heat of the combustion to vaporize more bromin, the rate of vaporization being controlled by the rate of such combustion.

3. In a method of making hydrobromic acid the steps which consist in burning hydrogen and bromin vapor, utilizing the heat of the combustion to vaporize more bromin, and maintaining the supply of bromin, so as to make the process continuous.

4. In a method of making hydrobromic acid the steps which consist in burning hydrogen and bromin vapor, utilizing the heat of the combustion to vaporize more bromin, and automatically maintaining the supply of bromin, so as to make the process continuous.

5. In a method of making hydrobromic acid the steps which consist in directing an ignited jet of hydrogen onto a body of liquid bromin, whereby the latter is gradually vaporized and the combustion of such hydrogen and the bromin vapor continued.

6. In a method of making hydrobromic acid the steps which consist in directing an ignited jet of hydrogen downwardly onto a body of liquid bromin, whereby the latter is gradually vaporized and the combustion of such hydrogen and the bromin vapor continued, and maintaining the level of such body substantially constant.

7. In a method of making hydrobromic acid the steps which consist in directing an ignited jet of hydrogen downwardly onto a body of liquid bromin, whereby the latter is gradually vaporized and the combustion of such hydrogen and the bromin vapor continued, and automatically maintaining the level of such body substantially constant.

8. In apparatus for making hydrobromic acid, the combination of a chamber closed to the atmosphere and having a discharge duct, means for maintaining a body of liquid bromin in said chamber, and a hydrogen supply pipe disposed to direct an ignited jet of hydrogen onto such body.

9. In apparatus for making hydrobromic acid, the combination of a chamber closed to the atmosphere, and having a discharge duct, means for maintaining a body of liquid bromin in said chamber, and a vertically adjustable hydrogen supply pipe disposed to direct an ignited jet of hydrogen onto such body.

10. In apparatus for making hydrobromic acid, the combination of a chamber closed to the atmosphere, and having a discharge duct, means for maintaining a body of liquid bromin in said chamber, a hydrogen supply pipe disposed to direct an ignited jet of hydrogen onto such body, and means for spreading such jet.

11. In apparatus for making hydrobromic acid, the combination of a chamber closed to the atmosphere, and having a discharge duct, means for maintaining a body of liquid bromin in said chamber, a hydrogen supply pipe disposed to direct an ignited jet of hydrogen onto such body, a flange surrounding said pipe near its lower end adapted to spread such jet.

12. In apparatus for making hydrobromic acid, the combination of a chamber closed to the atmosphere and having a discharge duct, means adapted automatically to maintain a body of liquid bromin in the lower portion of said chamber at approximately a constant level, and a hydrogen supply pipe disposed to direct an ignited jet of hydrogen onto such body.

13. In a process for making hydrobromic acid from bromin and hydrogen, the steps which consist in heating a body of bromin in a suitable receptacle whereby bromin vapor is caused to ascend from such body, introducing a current of hydrogen into such receptacle, and burning the bromin vapor by means of such hydrogen at the place where the two meet.

Signed by me this 22 day of August, 1918.

COULTER W. JONES.